350-373 SR 041C WR SEARCH ROOM
OR 3,503,667
X 4021 V
March 31, 1970 K. J. SCHMIDT-TIEDEMAN 3,503,667
MODULATORS FOR ELECTROMAGNETIC RADIATION BY DOUBLE REFRACTION
Filed Aug. 3, 1966
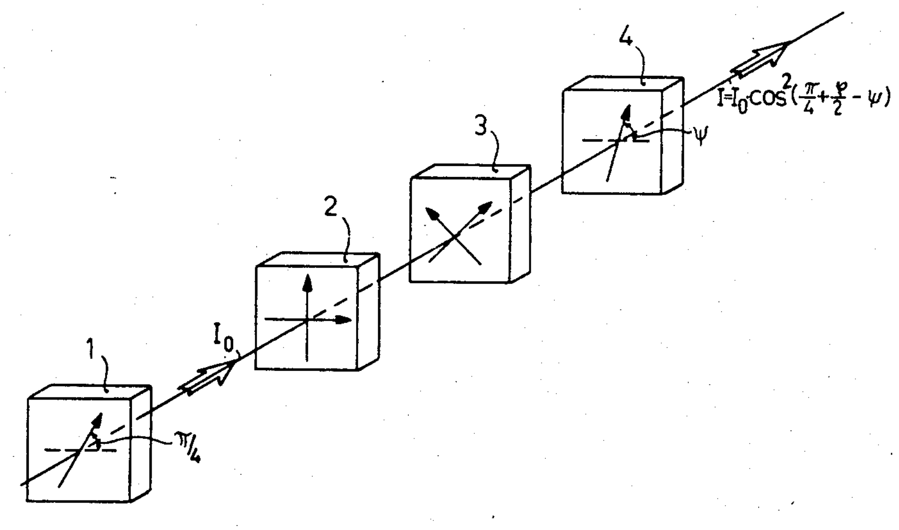
INVENTOR.
KARL J. SCHMIDT-TIEDEMAN
BY
Frank R. Jinfani
AGENT

United States Patent Office 3,503,667

Patented Mar. 31, 1970

3,503,667

MODULATORS FOR ELECTROMAGNETIC RADIATION BY DOUBLE REFRACTION

Karl Joachim Schmidt-Tiedeman, Rellingen, Germany, assignor, by mesne assignments, to U.S. Philips Corporation, a corporation of Delaware Filed Aug. 3, 1966, Ser. No. 570,015
Claims priority, application Germany, Aug. 10, 1965, P 37,427
Int. Cl. G02f 1/24
U.S. Cl. 350—149 10 Claims

ABSTRACT OF THE DISCLOSURE

An apparatus for modulating electromagnetic radiation, particularly light, wherein the light illuminates a medium, particularly a solid such as silicon or germanium, and is doubly refracted by the medium. The concentration of free charge carriers in the medium is modulated by controlling the injection of charge carriers. This changes the degree of the double refraction effect thus causing amplitude or phase modulation. The medium can be stressed to increase the efficiency.

The invention relates to an arrangement for modulating electromagnetic radiation by double refraction due to free charge carriers in a solid body.

It is known that in a solid body double refraction may occur due to free charge carriers, said double refraction being dependent on the effective masses of the the free charge carriers. The anisotropy of the effective masses in many substances, for example germanium and silicon, depends upon the elastic stress of the material and may be controlled by modulating such stress. This has been described by the inventor in "Zeitschrift fur Naturforschung" Band 16a, No. 6, 1961, page 639.

There are other known modulating methods which are based on the double refraction by bonded electrons in insulators. The optical anisotropy of the material used for the modulation is controlled by electric fields (Kerr effect, Pockels effect) or by elastic stress (photoelastic effect) in accordance with the modulating signal. It is disadvantageous in this case that electrooptical modulators require high field intensities of about 10 kv./cm., whereas in photoelastic modulators difficulties arise in producing elastic stresses of the order of 100 kgs./cm.$^2$ with adequate frequency in a sufficient bandwidth with adequate homogeneity in a sufficient large region.

It is also known to modulate electromagnetic radiation by absorption by free charge carriers in semiconductors, in which case the modulating signal influences either the concentration of the injected charge carriers or the temperature by heating with the aid of an auxiliary field. The last mentioned devices are only suitable for use in the microwave range and have no modulation properties for light, inclusive of infrared radiation. Moreover, very high control-powers of the order of megawatts/cc. are required.

In contrast thereto the modulating method according to the invention utilizes mainly the double refraction by free charge carriers and is characterized in that the concentration of the free charge carriers is controlled by the modulating signal, there being provided means to utilize the resultant variations of the double refraction by free charge carriers in known manner for amplitude or phase modulation of an electromagnetic radiation. The concentration of the charge carriers is preferably controlled by the injection of carriers. It is assumed that the material is optically anisotropic. Semiconductors having natural anisotropy (for example SiC, CdS) exhibit usually such a great double refraction by bonded electrons that only beams of radiation of very small aperture can be used.

Therefore, in one embodiment of the invention use is preferably made of an optically isotropic basic material which is elastically stressed. This permits of obtaining a particularly advantageous ratio between the part of the free carriers and the part of the crystal lattice, so that the powers required for the modulation need only be comparatively small.

An important embodiment of a modulator for carrying out the method according to the invention is characterized in that the solid substance serving as a modulator is statically stressed in an elastic manner in which the radiation is transmitted in the direction of an optical axis of the unstressed material, which may be isotropic.

There is preferably employed a germanium crystal which is prestressed in the direction of a space diagonal of the cubic crystal lattice.

It is furthermore advantageous to use a silicon crystal, which is prestressed in the direction of a space diagonal or in the direction of one of the edges of the cubic crystal lattice.

The modulation is based on an interaction between the light rays entering the modulator and the injected free charge carriers. If the concentration of the injected carriers is not homogeneous in space and is varied in time according to a differential equation (diffusion equation in connection with the recombination) with the injected flow, the intensity of the emerging light may be found by the spacial average (in the cross section of the modulator) and by the Fourier analysis of the carrier distribution (owing to the appearance of sidebands of the higher order).

The construction of a modulator according to the invention is schematically shown in the figure; reference numeral 1 designates the polariser or a polarised light source, for example a laser source; 2 designates the modulator in which the double refraction by free charge carriers is controlled in accordance with the modulating signal and which consists of an optically isotropic, for example, cubic crystal. 3 denotes a $\lambda/4$ plate, which converts elliptically polarised light into linearly polarised light; 4 is an analyser which may also consist of a crystal of the sort from which emerges the modulated radiation.

In the simplest case of a homogeneous distribution of the injected charge carriers the modulation percentage of a double-refracting modulator is as follows. The transmitted intensity I depends upon the incident intensity $I_0$, the phase shift $\varphi$ in the modulator (phase difference between the two partial waves passing through the modulator crystal) and the orientation $\psi$ of the analyser in accordance with the equation:

$$I=I_0 \cos^2\left(\frac{n}{4}+\frac{\psi}{2}-\psi\right)$$

In the absence of the modulating signal the phase shift is asumed to be $\varphi_q$. The maximum modulation is obtained, if $2\psi=\varphi_q+k\pi$ is adjusted (then $d^2Id\varphi^2=0$). In this case:

$$I_q=\frac{1}{2}I_0$$

and $$\delta I=\pm I_q\delta\varphi\cdot \text{ for } k=\begin{cases}2n+1\\2n\end{cases} n=0, 1, 2 \cdots$$

The modulated phase shift $\delta\varphi$ is proportional to the number of the injected carrier pairs $\delta n$, consisting of electrons and holes. In general, the influence of the holes is small as compared with that of the electrons. Particularly, in the conventional combinations, that is to say germanium under <111> stress and silicon under <100> stress, the radiation passing at right angles to the direction of stress, this assumption is satisfactorily true.

The elastic stress has to be as high as possible. Experimentally extensions of about 1% at the most can be obtained, which corresponds to a stress of about $10^4$ kgs./cm.$^2$. The double-refraction modulator using germanium operates in the wavelength range upwards of 2$\mu$ more effectively than the modulators hitherto known. For wavelengths of 1$\mu$ to 2$\mu$, in which case germanium is no longer serviceable due to the fundamental absorption, the double-refraction modulator using silicon is found to be superior by one order of magnitude to modulators based on absorption by injection.

What is claimed is:

1. An apparatus for modulating an electromagnetic wave comprising means for doubly refracting said wave including a medium having free charge carriers and illuminated by the wave, and means for varying the double refraction of said medium including means for controlling the concentration of said free charge carriers within said medium.

2. An apparatus as claimed in claim 1 wherein said concentration controlling means comprises means for injecting charge carriers into said medium.

3. An apparatus as claimed in claim 1 wherein said medium comprises a solid.

4. An apparatus as claimed in claim 1 further comprising means for stressing said medium at a constant value.

5. An apparatus as defined in claim 4 wherein said medium comprises germanium and said stress is applied in the direction of a space diagonal of the cubic elementary cell.

6. An apparatus as defined in claim 4 wherein said medium comprises silicon.

7. An apparatus as defined in claim 6 wherein said stress is applied in the direction of a space diagonal of an elementary cubic cell.

8. An apparatus as defined in claim 6 wherein said stress is applied in the direction of an edge of an elementary cubic cell.

9. An apparatus as defined in claim 1 wherein the resultant modulation is amplitude modulation.

10. An apparatus as defined in claim 1 wherein the resultant modulation is phase modulation.

References Cited

UNITED STATES PATENTS

| | | | |
|---|---|---|---|
| 3,242,805 | 3/1966 | Harrick | 350—160 |
| 3,387,230 | 6/1968 | Marinace | 350—161 X |

OTHER REFERENCES

Schmidt-Tiedemann: "Experimental Evidence of Birefringence by Free Charge Carriers in Semiconductors," Phys. Rev. Lett., vol. 7 (Nov. 15, 1969) pp. 372–374.

Schmidt-Tiedemann: "Stress Optical Constants of Germanium," J. App. Phys., vol. 32 (October 1961), pp. 2058–2059.

Schmidt-Tiedemann: "Optische Doppelbrechung durch freie Träger in Halbleitern" Zts. für Naturforschung, 16a (1961) p. 639.

DAVID SCHONBERG, Primary Examiner

P. R. MILLER, Assistant Examiner

U.S. Cl. X.R.

350—150, 157, 160